Dec. 18, 1928.   1,695,528
W. K. BROWNLEE
GLASS FURNACE
Filed May 21, 1923
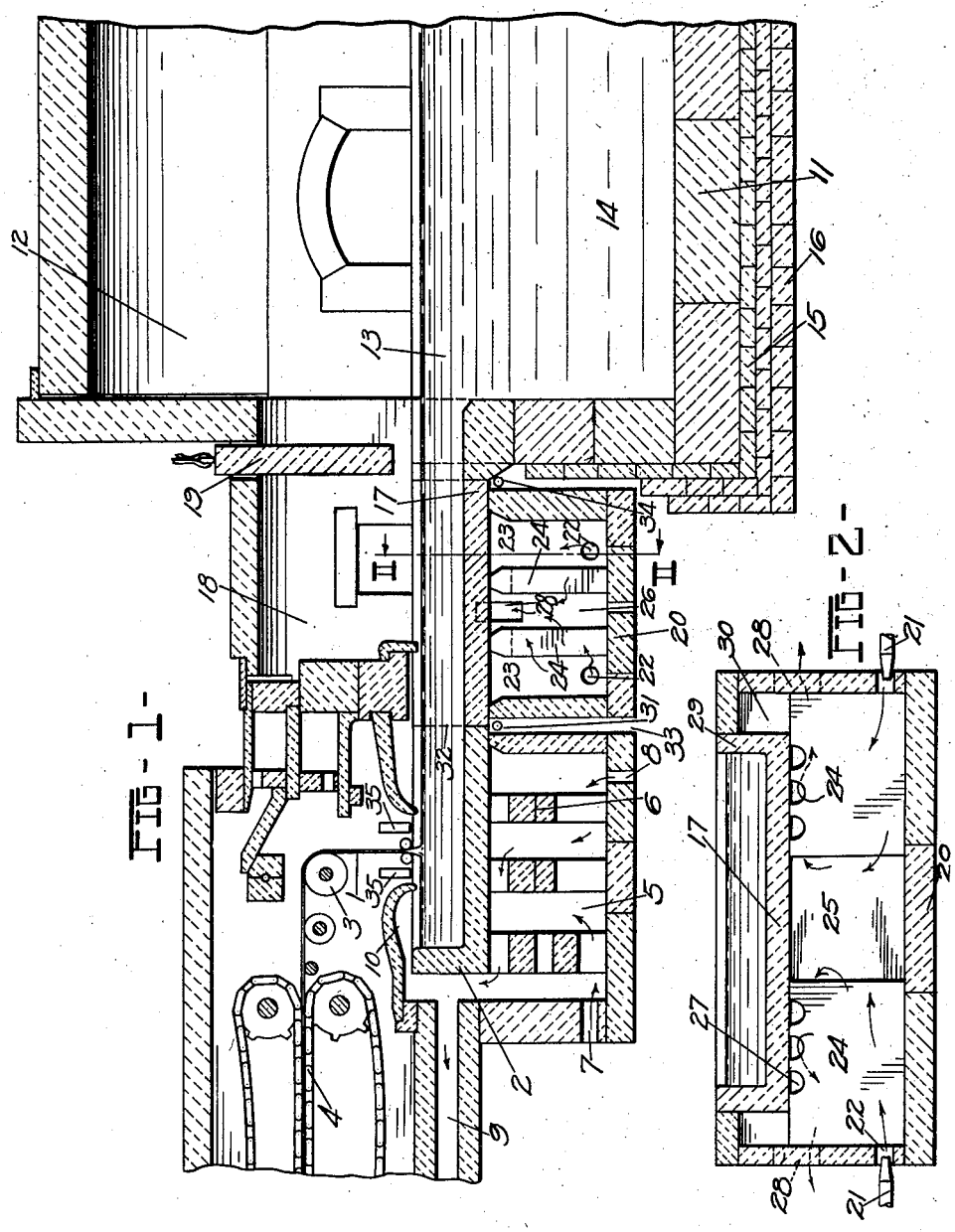
INVENTOR
William K. Brownlee
BY C.A. Powley
ATTORNEY Patented Dec. 18, 1928.

1,695,528

UNITED STATES PATENT OFFICE.

WILLIAM K. BROWNLEE, OF TOLEDO, OHIO, ASSIGNOR TO THE LIBBEY-OWENS SHEET GLASS COMPANY, OF TOLEDO, OHIO, A CORPORATION OF OHIO.

GLASS FURNACE.

Application filed May 21, 1923. Serial No. 640,347.

This invention relates to the art of drawing sheet glass and more particularly to an improved furnace construction for producing the molten glass and delivering same to the sheet source.

In installations now in use, such as shown for example in the patent to Colburn 1,248,809, granted Dec. 4, 1917, the glass sheet is drawn from a rather shallow receptacle or draw-pot, closed at one end and in open communication at the other with a continuous tank furnace. The furnace comprises a long comparatively deep tank normally full of molten glass and glass-producing materials. At the melting end of this tank a series of gas flames play upon the surface of the molten mass of material. The glass-producing batch and cullet are inserted at this end of the furnace and after being melted flow slowly through the tank toward the sheet-drawing machine. It is necessary for the molten glass to be refined or "settled" until it reaches the required state of plasticity and homogeneity before being drawn into glass sheets. The entire tank is enclosed so that the surface glass is always exposed to a heated atmosphere, but usually no further heat is applied after the glass passes beyond the melting end of the tank. As the glass flows through the so-called "refining" end of the tank, the surface glass loses some heat but still retains a rather high temperature. In the form of tank disclosed in the Colburn patent above noted, the glass flows through a smaller "cooling" chamber intermediate the refining tank and the draw-pot. This cooling tank, in which the refining and cooling process is continued, is much shallower than the refining tank and the arched chamber above is lower.

While this molten glass is passing through the refining and cooling tanks, the lower strata of the glass lose a great deal of heat which is conducted and radiated away by the enclosing walls of the tanks. In this way the lower and side portions of the molten glass becomes cooler and stiffer, and tend to stagnate, so that the greater portion of the flow is confined to the surface glass. This retardation of the lower and side strata is also caused by the friction of the flowing glass against the walls and bottom of the tank. This limitation of the flow to the surface strata greatly decreases the producing capacity of the tank, and consequently the rate at which sheet glass can be successively drawn therefrom. It is also objectionable to have semi-stagnant glass in the tank which loses its proper consistency and tends to devitrify.

The object of the present invention is to so vary the tank construction that the molten glass will maintain a more nearly equal temperature from top to bottom, and the flow will be more uniform and not confined merely to the surface strata. This is accomplished partly by adding insulations around the deeper portions of the refining tank to decrease the heat loss in this portion of the furnace, and partly by positively heating the shallower tank portion between the refining tank and the drawing point for the sheet.

The invention will be more clearly understood from the following drawings and detailed description disclosing one approved form of the apparatus.

In the accompanying drawings:

Fig. 1 is a vertical longitudinal section through the portions of the sheet drawing apparatus and furnace that have been changed to embody the principles of this invention.

Fig. 2 is a transverse vertical section taken substantially on the line II—II of Fig. 1.

As in the Colburn patent noted above, the glass sheet 1 is drawn upwardly from the shallow receptacle or draw-pot 2, deflected over bending roll 3 and carried away through drawing and flattening mechanism 4 into the leer. All of this structure and operation is well known in the art and may be ascertained in detail from the Colburn patent noted above. As in this Colburn patent, a heating furnace 5 is located beneath the draw-pot 2, which is supported on suitable arches or stools 6 within the furnace. The heating gases enter through ports 7 and 8 and after passing around the bottom and sides of the pot 2 pass out through flue 9 and under cover tile 10 above the closed end of the pot.

At 11 is shown the delivery end of the refining tank which is merely a prolongation of the melting tank in which the glass-producing materials are reduced to molten glass. This refining tank 11 is housed by the chamber 12 which is a continuation of the melting chamber and confines a highly heated atmosphere above the surface of the molten glass. The surface glass 13 will cool somewhat but will be retained at a relatively high temperature by the heated atmosphere above. However, the lower strata 14 of the molten glass in this chamber will ordinarily lose considerable heat which is conducted and radiated away by the walls of the tank 11. In tanks now in use there will normally be a loss of about 100° F. to each foot of depth in this tank. To decrease the heat loss at this point, the refining tank in this new construction is surrounded with walls of suitable insulating material, these walls being thicker toward the lower portion of the tank where the heat loss is the greatest. As illustrated, the greater portion of the tank 11 is enclosed with a layer of fire brick 15. The lower portions of the tank are further surrounded with one or more layers of suitable insulating bricks or blocks. An excellent material for this purpose is known as silocel, whose basis is kieselguhr. The insulating walls may be constructed of silocel bricks united into solid walls by a cement formed of the same material.

From the refining tank 11, the molten glass flows through an intermediate shallow tank 17 to the draw-pot 2. This tank is enclosed by a lower arched housing 18, commonly known as the "cooling" chamber, although the temperature in this chamber is also quite hot, as the chamber is in communication with the heated chamber 12. Preferably an adjustable gate 19 is provided between these two chambers to regulate to some extent the temperature prevailing in cooling chamber 18. In prior constructions, the intermediate cooling tank 17 was exposed to the surrounding atmosphere and had quite a chilling effect upon the molten glass adjacent the walls and bottom of this tank. This prior construction is shown at 2 in the Colburn patent 1,248,809, above referred to. This construction so chills the bottom and edge portions of the shallow stream of molten glass that only the upper strata flow freely through the tank, thus greatly diminishing the volume and depth of the molten glass delivered to the draw-pot 2.

In the improved construction herewith disclosed, the tank 17 is substantially a continuation of the draw-pot 2 and is mounted over and carried by a second heating furnace 20, somewhat similar to the one shown at 5 for heating the draw-pot 2. The tank 17, like the draw-pot 2, is molded as a single unit from fire-clay or similar material. In this furnace 20, the burners 21 deliver their heat through ports 22 to the chambers 23 at the two ends of the furnace. These chambers 23 are formed by the supporting partitions 24 which extend part way from the side walls of the furnace toward the center of the tank 17, leaving a passage 25 between their inner edges through which the heated gases pass to a central chamber 26. Some portions of the heated gases also pass from chambers 23 to the central chamber 26 through the passages 27 formed by cutting away portions of the tank-supporting upper edges of the partitions 24. The heated gases and products of combustion are drawn out from the central chamber 26 through the flues 28. It is to be understood that the furnace here shown is merely one example of many that might be used for supporting and heating the tank 17. It will be noted that this furnace also encloses the side portions 29 of the tank as at 30, to heat the molten glass adjacent the sides of the tank. A chilling water pipe 31 is placed below the joint 32 between tanks 2 and 17 to prevent leakage at this point. It will also be observed that a cooling space 33 is left between the two furnaces 5 and 20, so as to assist in cooling the joint 32. A similar cooling pipe 34 is placed below the connection between tank 17 and refining tank 11.

In this improved construction, as the molten glass flows slowly through refining tank 11, the loss of heat from the lower strata of the molten glass will be greatly reduced by the insulation walls 15 and 16. As the glass flows into and through the tank 17, the lower and side strata of this glass will be positively heated from the furnace 20 so that the temperature of the lower strata will be raised as high or higher than that of the surface glass. This will not only increase the fluidity of the lower strata so that they will flow more freely, but will also lubricate the side and bottom walls of the tank 17 to reduce the friction and permit a freer passage of the glass through the tank. As a result, a more uniform flow of glass is delivered to the draw-pot or receptacle 2 throughout substantially the entire depth of the glass in this receptacle. It is necessary to use a somewhat more intense cooling means at 35, or provide a larger exposed area of the surface glass adjacent the sheet source, than has been the prior practice, to compensate for the somewhat higher temperature of the glass delivered to the draw point. By employing this greater cooling means and the larger volume of flow of molten glass to the pot 2, the sheet 1 may be drawn at a much more rapid rate than has been the prior practice, thus greatly increasing the production and efficiency of the machine.

Claims:

1. In the art of drawing sheet glass, the method of supplying molten glass to the pool from which the sheet is drawn, consisting in melting the glass producing materials, flowing the molten glass to the sheet source through a refining and cooling chamber, and simultaneously heating the lower strata and side portions of the flowing glass.

2. In the art of drawing sheet glass, the method of supplying molten glass to the pool from which the sheet is drawn, consisting in melting the glass producing materials, flowing the molten glass to the sheet source through a refining and cooling chamber, and simultaneously heating the lower strata and side portions of the flowing glass, without adding heat to the surface strata.

3. In the art of drawing sheet glass, the step of applying heat to the lower strata and side portions of the flow of molten glass to the sheet source to compensate for the heat normally conducted and radiated away by the walls of the container.

4. In a sheet glass drawing apparatus, the combination with a receptacle for a pool of molten glass, means for drawing a glass sheet therefrom, and a melting tank wherein the molten glass is produced, of a shallow refining tank through which the glass passes from the melting tank to the drawing receptacle, an enclosing chamber above the surface glass in the refining tank, and a heating furnace enclosing the bottom and side walls of the refining tank.

5. In a sheet glass drawing apparatus, the combination with a receptacle for a pool of molten glass, means for drawing a glass sheet therefrom, and a melting tank wherein the molten glass is produced, of a comparatively deep refining tank, and a comparatively shallow refining tank through which tanks the molten glass passes successively to the receptacle, a wall of insulating material confining the lower portions of the deeper tank, and a heating furnace beneath the shallower tank and the receptacle.

6. In a sheet glass drawing apparatus, a refining tank through which the molten glass passes, a housing confining a heated atmosphere above the tank, and a heating furnace surrounding the bottom and sides of the tank.

7. In a sheet glass drawing apparatus, the combination with a melting tank, of a pair of similar shallow tanks or receptacles arranged in open communication with one another, the molten glass flowing from the melting tank through one of the receptacles into the other, means for drawing glass in sheet form from the latter receptacle, an enclosing chamber above the first named shallow receptacle, and heating means beneath both of the shallow receptacles.

8. In a sheet glass drawing apparatus, the combination with a melting tank, of a pair of similar shallow tanks or receptacles arranged in open communication with one another, the molten glass flowing from the melting tank through one of the receptacles into the other, means for drawing glass in sheet form from the latter receptacle, an enclosing chamber above the first named shallow receptacle, and a separate heating chamber beneath each of the shallow receptacles.

Signed at Toledo, in the county of Lucas, and State of Ohio, this 16th day of May, 1923.

WILLIAM K. BROWNLEE.